United States Patent [19]
Clagett et al.

[11] Patent Number: 5,346,967
[45] Date of Patent: Sep. 13, 1994

[54] BLENDS OF THERMOPLASTIC POLYESTER RESINS AND AMORPHOUS POLYAMIDES

[75] Inventors: Donald C. Clagett; Daniel W. Fox; Louis M. Maresca, all of Pittsfield, Mass.

[73] Assignee: General Electric Company, Pittsfield, Mass.

[21] Appl. No.: 8,267

[22] Filed: Jan. 25, 1993

Related U.S. Application Data

[63] Continuation of Ser. No. 693,775, Apr. 26, 1991, abandoned, which is a continuation of Ser. No. 117,246, Nov. 4, 1987, abandoned.

[51] Int. Cl.$^5$ ............................................... C08L 77/00
[52] U.S. Cl. .................. 525/425; 264/176.1; 264/219; 264/239
[58] Field of Search .................. 525/425; 264/176.1, 264/219, D61, 239

[56] References Cited

U.S. PATENT DOCUMENTS 4,097,446  6/1978  Abolins et al. ...................... 525/425

*Primary Examiner*—Ana L. Carrillo

[57] ABSTRACT

Thermoplastic resins of enhanced solvent resistance especially useful for packaging or automotive parts comprising blends of amorphous polyamides with a thermoplastic polyester resin, substantially free of a polyarylate have excellent physical properties and barrier resistance to oxygen and carbon dioxide. Preferred blends comprise polyesters prepared by reacting a dihydric alcohol with a dicarboxylic acid, and amorphous polyamides prepared from non-symmetric monomers comprising odd-number chain diamines and diacids, and meta aromatic diamines and diacids.

14 Claims, No Drawings

BLENDS OF THERMOPLASTIC POLYESTER RESINS AND AMORPHOUS POLYAMIDES

This is a continuation of Ser. No. 07/693,775 filed on Apr. 26, 1991, now abandoned, which is a continuation of Ser. No. 07/117,246 filed on Nov. 4, 1987, now abandonded.

CROSS-REFERENCE TO RELATED APPLICATION

This application is related to commonly owned patent application

| SER. NO. | FILED | FOR | APPLICANTS | STATUS |
|---|---|---|---|---|
| 812,433 | 12/23/85 | THERMO-PLASTIC BLENDS WITH AMORPHOUS POLYAMIDE | L. M. Maresca D. C. Clagett U. S. Wascher | Abandoned |

FIELD OF THE INVENTION

The present invention relates to thermoplastic resin blends containing an amorphous polyamide resin and a polyester resin. More particularly, the present invention relates to thermoplastic resin blends containing an amorphous polyamide resin and a thermoplastic polyester resin substantially free of polyarylate.

BACKGROUND OF THE INVENTION

Polyester resins are well known thermoplastic materials which, due to their many advantageous physical properties, find use as thermoplastic engineering materials in many commercial and industrial applications. These resins, for example, exhibit excellent properties of toughness, flexibility, impact strength, heat resistance, chemical resistance and excellent surface appearance. In some cases these polyesters also have good barrier properties. Such resins may generally be prepared by the reaction of a dihydric alcohol and a dicarboxylic acid or chemical equivalent thereof.

For some specialized applications, i.e. automotive parts, it is important that such resins have enhanced chemical resistance to aggressive solvents, for example, acetone, aromatic solvents, gasoline, and the like, to a degree which may not be necessary in most other applications. We have found that blends of polyesters and amorphous polyamides have the excellent solvent resistance required for this application.

Although polyesters such as polyethylene terephthalate are currently used in packaging applications special processing to orient the material is necessary in order to obtain good barrier properties. It has now also been discovered that addition of amorphous polyamide to the polyesters improves barrier properties without the need for orientation.

SUMMARY OF THE INVENTION

Briefly, according to the present invention, there are provided amorphous polyamide blends with polyesters, substantially free of polyarylate, having unexpectedly improved barrier resistance to carbon dioxide and oxygen. Such blends comprise:

(i) at least one thermoplastic polyester resin, substantially free of any polyarylate; and (ii) an amorphous polyamide resin.

The amorphous polyamide resin provides improved solvent resistance and high barrier resistance to carbon dioxide and oxygen.

DETAILED DESCRIPTION OF THE INVENTION

With respect to the polyester component (i) these are derived from an aliphatic diols, aliphatic ether or cycloaliphatic diols, or mixtures thereof, containing from 2 to about 20 carbon atoms and at least one dicarboxylic acid, such as an aliphatic dicarboxylic acid, e.g., adipic acid, sebacic acid, a cycloaliphatic dicarboxylic acid, such as cyclohexanedicarboxylic acid or aromatic dicarboxylic acid such as isophthalic acid or terephthalic acid. Preferred polyesters are derived from an aliphatic diol and an aromatic dicarboxylic acid and have repeating units of the following general formula:

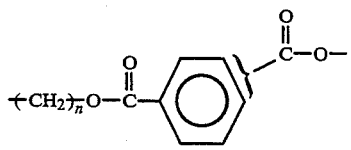

wherein n is an integer of from 2 to 6. The most preferred polyesters are poly(ethylene terephthalate) and poly(1,4-butylene terepththalate).

Also contemplated herein are the above polyesters with minor amounts, e.g., from 0.5 to about 10 percent by weight, of units derived from aliphatic polyols, to form copolyesters. The aliphatic polyols include glycols, such as poly(ethylene glycol) or poly(propylene glycol).

The polyesters derived from a cycloaliphatic diol and an aliphatic, aromatic and/or cycloaliphatic dicarboxylic acid are prepared, for example, from reaction of either the cis- or trans-isomer (or mixtures thereof), for example, 1,4-cyclohexanedimethanol, with a dicarboxylic acid or reactive derivative thereof so as to produce a polyester having recurring units of the following formula:

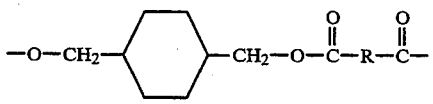

wherein the cyclohexane ring is selected from the cis- and trans-isomers thereof and R represents an alkyl of 1 to 10 carbon atoms, alkylaryl, aryl, arylalkyl or cycloaliphatic radical containing 6 to 20 carbon atoms and which is the decarboxylated residue derived from a dicarboxylic acid or obvious equivalent, e.g., a diester, a diacid chloride, etc.

Examples of dicarboxylic acids represented by the decarboxylated residue R are isophthalic or terephthalic acid, 1,2-di(p-carboxyphenyl) ethane, 4,4'-dicarboxydiphenyl ether, etc., and mixtures of these. Preferably the acids contain at least one aromatic nucleus. Acids containing fused rings can also be present, such as in 1,4- or 1,5-naphthalene dicarboxylic acids. Also contemplated are aliphatic, and cycloaliphatic diacids, such as sebacic acid, adipic acid, glutaric acid, azelaic acid, and cyclohexane dicarboxylic acid. The preferred dicarboxylic acids are terephthalic acid or a mixture of terephthalic and isophthalic acids.

Another preferred polyester block may be derived from the reaction of either the cis- or trans-isomer (or a mixture thereof) of 1,4-cyclohexanedimethanol with a mixture of isophthalic and terephthalic acids. Such a polyester would have repeating units of the formula:

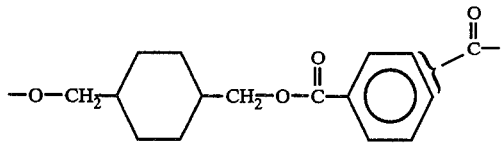

Still another preferred polyester is a copolyester derived from a 1,4-cyclohexanedimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol, such as ethylene glycol or 1,4-butanediol, with an aromatic dicarboxylic acid so as to produce a copolyester having units of the following formulae

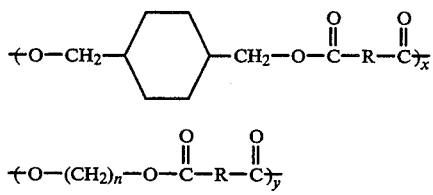

wherein the cyclohexane ring is selected from the cis- and trans-isomers thereof, R is as previously defined, n is an integer of 2 to 6, the x units comprise from about 10 to 90 percent by weight, and the y units comprise from about 90 to about 10 percent by weight. Preferably R is phenyl and the preferred polyesters are of the formula:

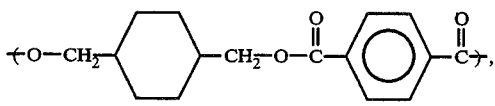

and

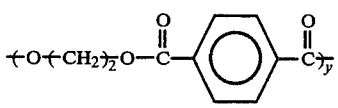

wherein x and y are as previously defined.

Also included within this invention are polyesters derived from aliphatic ether diols, for example, tetramethyleneoxy diol, and the same diesters of diacids.

The polyesters described herein are either commercially available or can be produced by methods well known in the art, such as those set forth in, for example, U.S. Pat. Nos. 2,901,466 and 3,651,014.

The polyesters used herein have an intrinsic viscosity of from about 0.4 to about 2.0 dl/g. as measured in a 60:40 phenol/tetrachloroethane mixture or similar solvent at 23°–30° C.

The polyesters used herein must be substantially free, i.e., contain less than 2%, preferably less than 1 percent, and most preferably 0% by weight of wholly aromatic polyester, i.e., polyarylates. Such polyarylate resins to be excluded herein are aromatic polyesters containing carboxylate groups,

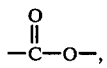

and aromatic carbocyclic groups in the linear polymer chain, in which at least some of the carboxylate groups join directly ring carbon atoms of the aromatic carbocyclic groups. Polyarylate polymers, in general, are prepared by reacting a aromatic dicarboxylic acid or ester forming derivative thereof, and a dihydric phenol. They may also be polymerized from a carboxylic acid/hydroxy functional monomer in a head-tail arrangement. They should be substantially absent.

Polyamides suitable as component (ii) for the preparation of the blends of the present invention may be obtained by polymerizing a monoamino-monocarboxylic acid or a lactam thereof having at least 2 carbon atoms between the amino and carboxylic acid group; or by polymerizing substantially equimolar proportions of a diamine which contains at least 2 carbon atoms between the amino groups and a dicarboxylic acid; or by polymerizing a monoaminocarboxylic acid or a lactam thereof as defined above together with substantially equimolar proportions of a diamine and a dicarboxylic acid. The dicarboxylic acid may be used in the form of a functional derivative thereof, for example, an ester or acid chloride. The term "substantially equimolar" proportions (of the diamine and of the dicarboxylic acid) is used to cover both strict equimolar proportions and slight departures therefrom which are involved in conventionel techniques for stabilizing the viscosity of the resultant polyamides.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring with the —CO—NH group in the case of a lactam. As particular examples of aminocarboxylic acids and lactams there may be mentioned: aminocaproic acid, butyrolactam, pivalolactam, caprolactam, capryllactam, enantholactam, undecanolactam, dodecanolactam and 3- and 4-aminobenzoic acids.

Diamines suitable for use in the preparation of the polyamides include the straight chain and branched, alkyl, aryl and alkyl-aryl diamines. Such diamines include, for example, diprimary and disecondary amines, e.g., those represented by the general formula:

RHN(CH$_2$)$_n$NHR

R is hydrogen or alkyl of from 1 to 15 carbon atoms or, when both R's are taken together, (CH$_2$)$_n$, or wherein n is an integer of from 2 to 16. Illustrative are: ethylenediamine, trimethylenediamine, tetramethylenediamine, pentamethylenediamine, hexamethylenediamine, as well as 2-methylpentamethylenediamine, isomeric trimethylhexamethylenediamine, meta-xylylenediamine, para-xylylenediamine, 1,3-bis(aminomethyl)cyclohexane, 1,4-bis (aminomethyl) cyclohexane, 1,3-diaminocyclohexane, 1,4-diaminocyclohexane, bis(4-aminocyclohexyl)methane, 2,2-bis(4-aminocyclohexyl)propane, 1,4-piperazine, meta-phenylenediamine, paraphenylenediamine, bis(4-aminophenyl) methane and the like or mixtures thereof.

The dicarboxylic acids may be aromatic or aliphatic dicarboxylic acids of the formula:

HOOC—Z—COOH wherein Z represents a divalent aliphatic group containing at least 2 carbon atoms or aromatic group containing at least 6 carbon atoms. Examples of such acids are sebacic acid, suberic acid, glutaric acid, pimelic acid, adipic acid, azelaic acid, terephthalic acid, isophthalic acid and the like.

Typical examples of the polyamides or nylons, as these are often called, include for example copolymers of polyamides 6, 6/6, 11, 12, 6/3, 4/6, 6/4, 6/10 or 6/12; polyamides resulting from the condensation of isophthalic and/or terephthalic acid and hexamethylenediamine, of isophthalic acid and/or terephthalic acid and trimethylhexamethylenediamine; polyamides resulting from the use of adipic acid and meta-xylylenediamines; polyamides resulting from the use of adipic acid, azelaic acid and bis-(p-aminophenyl)methane; and polyamides resulting from the use of terephthalic acid and bis-(4-aminocyclohexyl)methane. Mixtures and/or copolymers of two or more of the foregoing polyamides or prepolymers thereof, respectively, are also within the scope of the present invention.

It is also to be understood that the use of the term "polyamides" herein and in the appended claims is intended to include the toughened or super tough polyamides. Super tough polyamides, or super tough nylons, as they are more commonly known, are available commercially, e.g., from E. I. DePont under the tradename Zytel ®ST, or may be prepared in accordance with a number of patents including, among others, Epstein, U.S. Pat. No. 4,174,358; Novak, U.S. Pat. No. 4,474,927; Roura, U.S. Pat. No. 4,346,296; and Joffrion, U.S. Pat. No. 4,251,644. These super tough nylons are prepared by blending one or more polyamides with one or more polymeric or copolymeric elastomeric toughening agents. Suitable toughening agents are disclosed in the above-identified U.S. Patents as well as in Caywood, Jr., U.S. Pat. No. 3,884,882, and Swiger, U.S. Pat. No. 4,147,740 and Gallucci et al., "Preparation and Reactions of Epoxy-Modified Polyethylene", J. APPL. POLY. SCI., V. 27, pp. 425–437 (1982). Typically, these elastomeric polymers and copolymers may be straight chain or branched as well as graft polymers and are copolymers, including core-shell graft copolymers, and are characterized as having incorporated therein either by copolymerization or by grafting on the performed polymer, a monomer having functional and/or active or highly polar groupings capable of interacting with or adhering to the polyamide matrix so as to enhance the toughness of the polyamide polymer.

In general, it is true that all polyamides have both a crystalline and an amorphous state. However, as a practical matter, it is difficult to obtain many of the polyamides in the amorphous state. Symmetrical, hydrogen-bonded, linear polyamides are, invariably, highly crystalline with well defined x-ray patterns. Thus, it is difficult to avoid high degrees of crystallinity with polymers, e.g., nylon-6,6; -6,10; and -6, whose regular structures permit good chain alignment and high degrees of hydrogen bonding in the plane of the chains. Chain stiffness also contributes to crystallinity, rendering hydrogen bonding unnecessary for crystallinity where chain stiffness and symmetry are sufficiently high. Ring-containing polyamides, especially aromatic ring-containing polyamides such as polyterephthalamides, have high stiffness and tend to crystallinity. Thus, it is within the skill of persons knowledgeable in the art to produce amorphous polyamide through any one or a combination of several methods. Faster polyamide melt cooling tends to result in an increasingly amorphous resin. Side chain substitutions on the polymer backbone, such as the use of a methyl group to disrupt regularity and hydrogen bonding, may be employed. Non-symmetric monomers, for instance, odd-number chain diamines or diacids and meta aromatic substitution, may prevent crystallization. Symmetry may also be disrupted through copolymerization, that is, using more than one diamine, diacid or monoaminomonocarboxylic acid to disrupt regularity. In the case of copolymerization, monomers which normally may be polymerized to produce crystalline homopolymer polyamides, for instance, nylon 6; 6/6; 11; 12; 6/3; 4/6; 6/4; 6/10; or 6/12, may be copolymerized to produce a random amorphous copolymer. Amorphous polyamides for use herein are generally transparent with no distinct melting point, and the heat of fusion is about 1 cal/gram or less. The heat of fusion may be conveniently determined by use of a differential scanning calorimeter (DSC).

Blends of amorphous polyamide with polyester, substantially free of polyarylate, in any proportion will at least in some degree exhibit characterisitcs embodying the present invention. However, as a practical matter, the benefits of such blend will not be measurably significant outside a weight ratio of from about 2/98 to about 98/2 amorphous polyamide to total polyester. Preferably, this ratio is between about 10/90 to about 90/10.

Of course, the blends herein may contain other thermoplastic resins, various impact modifiers, stabilizers, flame retardants, mold release agents, reinforcing agents, pigments, and the like. Examples of the other thermoplastic resins include poly(etherimides), polysulfones, polyphenylene oxides, and the like. Generally, such other thermoplastic resins should not constitute greater than 80% by weight of total thermoplastic content. Many additives are widely used and recognized as suitable for use herein.

The thermoplastic blends of the present invention are simply prepared by standard techniques; for example, by simple melt blending or dry mixing and melt extruding at an elevated temperature. The extruded admixture is then molded into a piece of specific dimensions or further extruded into a film or sheet product.

DESCRIPTION OF THE PREFERRED EMBODIMENTS

Further illustration of this invention is set forth in the following examples. There is no intention to limit the scope of the invention to merely what is shown.

EXAMPLES 1-3

A series of amorphous nylon/polyester blends were prepared by melt blending poly (hexamethylene iso-/terephthalamide), E. I. DuPont, with poly(1,4-butylene terephthalate), VALOX ® 315 RESIN General Electric Company at weight ratios of 75/25, 50/50 and 25/75 in a Werner Pfleiderer ZSK, 30 mm twin screw extruder at barrel temperatures ranging from 430° F.–460° F. The resins were dried for at least 6 hours in an air circulating oven at 110° C. prior to extrusion. The resulting pelletized products were redried under similar conditions before being molded into ASTM test specimens on a 3 oz., 70 ton Newbury injection molding machine at 475° F. These materials all exhibited good mechanical properties.

EXAMPLES 4–6

Examples 1–3 were repeated except that poly(ethylene terephthalate) Cleartuf® 8006C resin, Goodyear, was substituted for the poly(1,4-butylene terephthlate). The blends were extruded at 460° F.–500° F. and injection molded at 515°–530° F. Mechanical properties on molded parts were good.

EXAMPLES 7–9

Examples 1–3 were repeated except that poly(1,4-cyclohexanedimethylene iso/terephthalate), Kodar-®A150, Eastman Kodak, was substituted for poly(1,4-butylene terephthalate). The blends were extruded at 460° F.–500° F. and injection molded at 520° F.–550° F. Mechanical properties on molded parts were good.

EXAMPLES 10–12

A series of 50/50 weight percent amorphous nylon 6,I blends with PBT, poly(1,4-butylene terephthalate); PCHT, poly(1,4-cyclohexanedimethylene iso/terephthalate) and PET, poly(ethylene terephthalate), were prepared using the procedure described in Examples 1–3. The pellets were then extruded into thin films (1–2 mils) on a 1" single screw Killion extruder equipped with a 6" film die and roller system. The extrusion temperatures for film production ranged from 50° F.–550° F. Oxygen transmission rates for these films were measured on a Mocon Ox-Tran 1000 Oxygen Permeability Tester. Results are summarized in Table 1.

TABLE 1

| | Oxygen Barrier Properties | |
|---|---|---|
| Example | Composition | Oxygen Transmission Rate cc* mil/ 100 in.$^2$/D* Atm |
| Comparative 10* A | PBT | 6.57 |
| 10 | PBT/nylon 6,I(50/50) | 3.75 |
| Comparative 11* A | PET | 8.51 |
| 11 | PET/nylon 6,I(50/50) | 3.45 |
| Comparative 12* A | PCHT | 20.42 |
| 12 | PCHT/nylon 6,I(50/50) | 2.49 |

*Control

Relative to the polyester resins, the nylon 6,I-containing blends show improved oxygen barrier properties.

EXAMPLES 13–21

Examples 1–9 were repeated except that poly(trimethylhexamethylene terephthalamide) Trogamid®, Dyanamit Nobel, was substituted for the polyhexamethylene iso/terephthalate Zytel® 330. Mechanical properties for these blends were good.

EXAMPLES 22–30

Examples 1–9 were repeated except that a polyamide made from bis(4-amino-3-methylcyclohexyl) methane, isophthalic acid and lauryl lactam, Grilamid® TR55, Emser Industries, was substituted for the poly(hexamethylene iso/terephthalate) Zytel® 330. Mechanical properties for these blends were good.

The above-mentioned patents, patent applications and publications are incorporated herein by reference.

Many variations will suggest themselves to those skilled in this art in light of the above, detailed description. All such obvious variations are within the full intended scope of the appended claims.

We claim:

1. A method for enhancing the barrier resistance of a molded article to oxygen and carbon dioxide consisting of (a) blending a composition consisting entirely of a thermoplastic polyester resin having an intrinsic viscosity of from about 0.4 to about 2.0 dl/g as measured in a 60:40 phenol:tetrachlorethane mixture at 23°–30° C. containing less than 2% of wholly aromatic resin moieties and an effective barrier-resistance-improving amount of an amorphous polyamide resin; and (b) molding said blend into an article of specific dimensions by extrusion or injection molding.

2. A method as defined in claim 1 wherein said blend comprises from about 2 to about 98 percent by weight of said polyester resin and from about 98 to about 2 percent by weight of said amorphous polyamide.

3. A method as defined in claim 2 wherein said blend comprises from about 10 to about 90 percent by weight of said polyester resin and from about 90 to about 10 percent by weight of said amorphous polyamide.

4. A method as defined in claim 1 wherein said amorphous polyamide has no distinct melting point.

5. A method as defined in claim 1 wherein said amorphous polyamide has a heat of fusion of about 1 cal/gram or less.

6. A method as defined in claim 1 wherein said amorphous polyamide has side chain substitution.

7. A method as defined in claim 1 wherein said amorphous polyamide is polymerized from monomers comprising non-symmetric monomers.

8. A method as defined in claim 7 wherein said non-symmetric monomers comprise odd-numbered chain diamines and diacids, and meta aromatic diamines and diacids.

9. A method as defined in claim 1 wherein said amorphous polyamide is a copolymer of at least two nylons selected from the group consisting of nylon 6, 6/6, 11, 12, 6/3, 4/6, 6/4, 6/9, 6/10 and 6/12.

10. A method as defined in claim 1 wherein said polyester comprises units derived from a dihydric alcohol.

11. A method as defined in claim 16 wherein said polyester comprises units derived from ethylene glycol, 1,4-butanediol, polybutylene oxide diol, 1,4-cyclohexanedimethanol or a mixture of any of the foregoing.

12. A method as defined in claim 1 wherein said polyester comprises units derived from terephthalic acid, isophthalic acid, or a mixture thereof.

13. A method for enhancing the barrier resistance of a molded article to oxygen and carbon dioxide consisting of (a) blending a composition consisting entirely of a thermoplastic polyester resin having an intrinsic viscosity of from about 0.4 to about 2.0 dl/g as measured in a 60:40 phenol:tetrachlorethane mixture at 23°–30° C. containing less than 2% of wholly aromatic resin moieties and an effective barrier-resistance-improving amount of an amorphous polyamide resin; and (b) molding said blend into a film or sheet product.

14. A method for enhancing the barrier resistance of a molded article to oxygen and carbon dioxide consisting of (a) blending a composition consisting entirely of a thermoplastic polyester resin having an intrinsic viscosity of from about 0.4 to about 2.0 dl/g as measured in a 60:40 phenol:tetrachlorethane mixture at 23°–30° C. containing less than 2% of wholly aromatic resin moieties and an effective barrier-resistance-improving amount of an amorphous polyamide resin; and (b) injection molding said blend into an article.

* * * * *